(12) United States Patent
Kawamae et al.

(10) Patent No.: US 8,311,219 B2
(45) Date of Patent: Nov. 13, 2012

(54) REPRODUCING APPARATUS, RECORDING APPARATUS AND DISPLAY APPARATUS

(75) Inventors: Osamu Kawamae, Yokohama (JP); Toshifumi Takeuchi, Tokyo (JP); Hiroyuki Kimura, Hiratsuka (JP); Takao Arai, Yokohama (JP); Hiroshi Yoshiura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/307,110

(22) Filed: Nov. 30, 2011

(65) Prior Publication Data
US 2012/0134498 A1    May 31, 2012

Related U.S. Application Data

(63) Continuation of application No. 12/840,726, filed on Jul. 21, 2010, now Pat. No. 8,074,071, which is a continuation of application No. 11/968,883, filed on Jan. 3, 2008, now Pat. No. 7,779,256, which is a continuation of application No. 10/677,359, filed on Oct. 3, 2003, now Pat. No. 7,379,547, which is a continuation of application No. 10/437,232, filed on May 14, 2003, now Pat. No. 7,043,645, which is a continuation of application No. 09/289,974, filed on Apr. 13, 1999, now Pat. No. 6,578,149.

(30) Foreign Application Priority Data

Apr. 14, 1998  (JP) .................................. 10-102386

(51) Int. Cl.
*H04L 9/16* (2006.01)
(52) U.S. Cl. .......................... 380/201; 705/57
(58) Field of Classification Search .................. 380/287, 380/201; 705/57
See application file for complete search history.

(56) References Cited

U.S. PATENT DOCUMENTS

| 5,199,066 A | | 3/1993 | Logan |
| 5,513,260 A | * | 4/1996 | Ryan ............................ 380/200 |
| 5,724,423 A | | 3/1998 | Khello |
| 5,757,909 A | | 5/1998 | Park |
| 5,883,958 A | | 3/1999 | Ishiguro et al. |
| 5,896,454 A | * | 4/1999 | Cookson et al. ............... 360/60 |
| 6,064,836 A | | 5/2000 | Nakamura et al. |

(Continued)

FOREIGN PATENT DOCUMENTS

EP    0 398 492    11/1990

(Continued)

*Primary Examiner* — Matthew Smithers
(74) *Attorney, Agent, or Firm* — Antonelli, Terry, Stout & Kraus, LLP.

(57) ABSTRACT

An authentication method for use in sending/receiving data between a coded data output apparatus for outputting coded data having a water mark, and a recording apparatus for recording data onto a recording medium, the method including: deciding a type of the recording medium used by the recording apparatus; based on a result of the deciding, selecting, from a plurality of authentication methods, an authentication method corresponding to the type of the recording medium, and conducting authentication between the coded data output apparatus and the recording apparatus, using the authentication method; sending/receiving data between the coded data output apparatus and the recording apparatus after conducting the authentication; and in a case where the coded data has the water mark, detecting the water mark by the coded data output apparatus, wherein the data exchanged between the coded data output apparatus and the recording apparatus is scrambled by a scrambling method corresponding to the type the recording medium.

12 Claims, 9 Drawing Sheets

U.S. PATENT DOCUMENTS

| | | |
|---|---|---|
| 6,230,002 B1 | 5/2001 | Floden et al. |
| 6,249,532 B1 | 6/2001 | Yoshikawa et al. |
| 6,289,102 B1 | 9/2001 | Ueda et al. |
| 6,336,187 B1 | 1/2002 | Kern et al. |
| 6,367,019 B1 | 4/2002 | Ansell et al. |
| 6,438,235 B2 | 8/2002 | Sims |
| 6,453,420 B1 | 9/2002 | Collart |
| 6,457,040 B1 | 9/2002 | Mizuhara et al. |
| 6,578,149 B1 | 6/2003 | Kawamae et al. |
| 6,587,948 B1 | 7/2003 | Inazawa et al. |
| 7,043,645 B2 | 5/2006 | Kawamae et al. |
| 7,379,547 B2 | 5/2008 | Kawamae et al. |
| 7,779,256 B2 | 8/2010 | Kawamae et al. |
| 2002/0061105 A1 | 5/2002 | Nakamura |
| 2004/0071443 A1 | 4/2004 | Kawamae et al. |

FOREIGN PATENT DOCUMENTS

| | | |
|---|---|---|
| EP | 0 714 204 | 5/1996 |
| EP | 0714204 | 5/1996 |
| EP | 0 773 490 | 5/1997 |
| EP | 0 814 474 | 12/1997 |
| EP | 0 862 293 | 9/1998 |
| EP | 0 977 436 | 2/2000 |
| GB | 2 155 676 | 9/1985 |
| GB | 2155676 | 9/1985 |
| JP | 05-130098 | 5/1993 |
| JP | 06-261033 | 9/1994 |
| JP | 7-013842 | 1/1995 |
| JP | 7-272402 | 10/1995 |
| JP | 8-297638 | 11/1996 |
| JP | 08-297638 | 11/1996 |
| JP | 09-018469 | 1/1997 |
| JP | 9-035030 | 2/1997 |
| JP | 09-097216 | 4/1997 |
| JP | 9-134572 | 5/1997 |
| JP | 9-185868 | 7/1997 |
| JP | 10-3744 | 1/1998 |
| JP | 10-031400 | 2/1998 |
| JP | 10-065662 | 3/1998 |
| JP | 10-79174 | 3/1998 |
| JP | 10-187969 | 7/1998 |
| JP | 2000-059323 | 2/2000 |
| WO | WO 97/14147 | 4/1997 |

\* cited by examiner

US 8,311,219 B2

REPRODUCING APPARATUS, RECORDING APPARATUS AND DISPLAY APPARATUS

CROSS REFERENCE TO RELATED APPLICATION

This application is a continuation of U.S. application Ser. No. 12/840,726, filed Jul. 21, 2010 now U.S. Pat. No. 8,074,071, which is a continuation of U.S. application Ser. No. 11/968,883, filed Jan. 3, 2008 (now U.S. Pat. No. 7,779,256), which is a continuation of U.S. application Ser. No. 10/677,359, filed Oct. 3, 2003 (now U.S. Pat. No. 7,379,547), which is a continuation of U.S. application Ser. No. 10/437,232, filed May 14, 2003 (now U.S. Pat. No. 7,043,645), which is a continuation of U.S. application Ser. No. 09/289,974, filed Apr. 13, 1999 (now U.S. Pat. No. 6,578,149). This application relates to and claims priority from Japanese Patent Application No. 10-102386, filed on Apr. 14, 1998. The entirety of the contents and subject matter of all of the above is incorporated herein by reference.

BACKGROUND OF THE INVENTION

The present invention relates to an apparatus for reproducing video data and audio data, and more particularly to an apparatus for reproducing data and the apparatus for recording data which are arranged to reproduce and/or record data from/onto a recording medium based on copy management information.

A DVD-ROM has about seven times as large a volume as a CD-ROM. The DVD-RON may contain program codes for PCs as well as motion picture software created by compressing video data and audio data. The DVD also includes a DVD-RAM, a DVD-R, and a DVD-RW as its recording medium. These recording medium may record a large amount of data, which brings about a possibility of illegally copying software such as a motion picture. This sort of illegal copy has to be prevented. Hence, a technique of preventing illegal copy becomes important. This technique is described in the magazine "Nikkei Electronics" issued on Aug. 18, 1997, pages 110 to 119, published by Nikkei BP publishing.

For example, the motion picture recorded on the DVD-Video disk is typically coded according to the CSS (content scrambling system). Hence, the copied data cannot be reproduced unless it is descrambled.

SUMMARY OF THE INVENTION

Indeed, the above-mentioned magazine describes the reproduction of the medium where data is pre-recorded such as a DVD-video disk. However, it does not describe the reproduction of a recording medium where a user can arbitrarily record data.

In the case of reproducing data scrambled according to the corresponding system to each recordable medium, it is necessary to take the step of discriminating the corresponding recording medium to a coming reproduction signal before descrambling the reproduction signal. Further, it is also necessary to discriminate a type of data, concretely, if the data copy is allowed or prohibited, before the control is executed.

In carrying out the foregoing object, according to an aspect of the invention, an apparatus for recording and reproducing data includes a plurality of authenticating means so as to allow authentication between apparatuses by switching among the plurality of authenticating means in correspondence to a type of data involved for carrying out authentication corresponding to the kind of the data.

An apparatus for recording data includes a plurality of authenticating means so as to allow authentication between apparatuses by switching among the plurality of authenticating means in correspondence to a type of data involved for carrying out authentication corresponding to the type of the data.

An apparatus for reproducing data includes a plurality of authenticating means so as to allow authentication between apparatuses by switching among the plurality of authenticating means in correspondence to a type of data involved for carrying out authentication corresponding to the type of the data.

A data reproducing method according to another aspect of the invention carries out authentication between apparatuses by switching among a plurality of authenticating methods in correspondence to a type of data involved for carrying out authentication corresponding to the type of the data.

A data recording method according to another aspect of the invention carries out authentication between apparatuses by switching among a plurality of authenticating methods in correspondence to a type of data involved for carrying out authentication corresponding to the type of the data.

A data coding method according to another aspect of the invention carries out authentication between apparatuses by switching among a plurality of authenticating methods in correspondence to a type of data involved for carrying out authentication corresponding to the type of the data.

An authenticating method according to another aspect of the invention carries out authentication between apparatuses by switching among a plurality of authenticating methods in correspondence to a type of data involved for carrying out authentication corresponding to the type of the data.

DESCRIPTION OF THE EMBODIMENTS

Hereafter, the present invention will be described along the embodiments with reference to the appended drawings.

Figure 1:
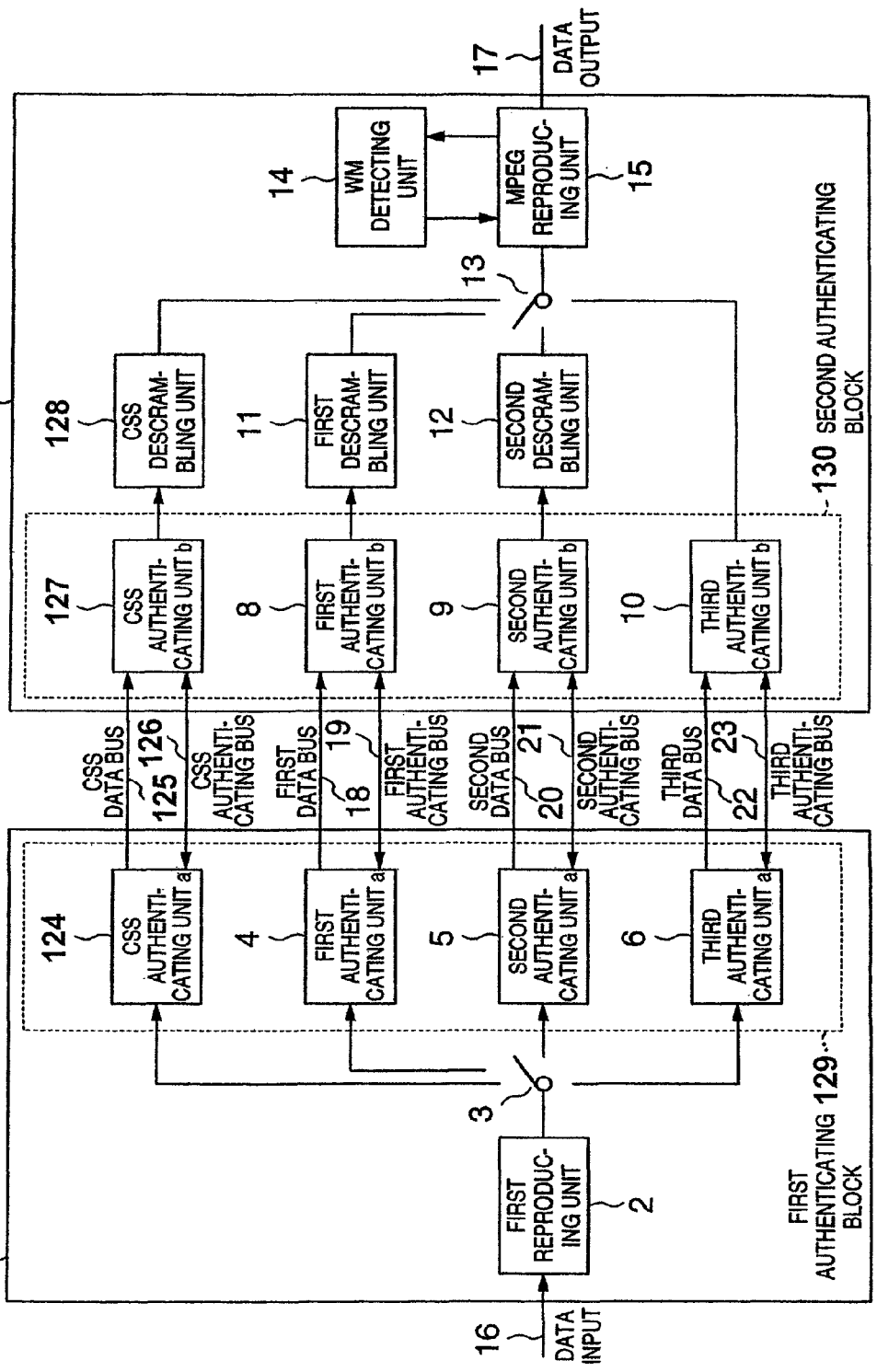
FIG. 1 is a block diagram showing an apparatus for reproducing data containing copy control information according to an embodiment of the present invention.

FIG. 1 shows an apparatus for reproducing data containing copy control information according to an embodiment of the invention. In this embodiment, a recordable and reproducible medium such as a DVD will be described. It goes without saying that it is not limited to an optical disk but may be applied to any kind of medium that stores data.

In FIG. 1, a numeral 1 denotes a first data reproducing apparatus. A numeral 2 denotes a first reproducing unit. A numeral 3 denotes a first switch. A numeral 4 denotes a first authenticating unit a. A numeral 5 denotes a second authenticating unit a. A numeral 6 denotes a third authenticating unit a. A numeral 7 denotes a second data reproducing apparatus. A numeral 8 denotes a first authenticating unit b. A numeral 9 denotes a second authenticating unit b. A numeral 10 denotes a third authenticating unit b. A numeral 11 denotes a first descrambling unit. A numeral 12 denotes a second descrambling unit. A numeral 13 denote a second switch. A numeral 14 denotes a WM detecting unit. A numeral 15 denotes an MPEG reproducing unit. A numeral 16 denotes data input. A numeral 17 denotes data output. A numeral 18 denotes a first data bus. A numeral 19 denotes a first authenticating bus. A numeral 20 denotes a second data bus. A numeral 21 denotes a second authenticating bus. A numeral 22 denotes a third data bus. A numeral 23 denotes a third authenticating bus. A numeral 124 denotes a CSS authenticating unit a. A numeral 125 denotes a CSS data bus. A numeral 126 denotes a CSS authenticating bus. A numeral 127 denotes a CSS authenticating unit b. A numeral 128 denotes a CSS descrambling unit. A numeral 129 denotes a first authenticating block. A numeral 130 denotes a second authenticating block.

The operation of the present system will be described with reference to FIGS. 1 and 2.

The data input 16, read from a disk by means of the first data reproducing apparatus such as a DVD drive, is descrambled according to the recorded format by the first reproducing unit 2. In this descrambling operation, the first reproducing unit 2 operates to read a type of data including a code for indicating a type of the recording medium contained in the data (for example, a code for indicating if the recording medium is dedicated to reproduction or recordable), a code for indicating whether or not the data structure is scrambled, and a code for indicating if the data is video or audio or copy limitation (for example, a code for indicating copy permission, one-generation copy permission, or copy prohibition). Further, for an optical disk, the type of the recording medium may be discriminated on a tracking signal of the disk. Based on the pieces of information read by the first reproducing unit 2, the first switch 3 is switched so as to select the corresponding authenticating unit to the read data. The authentication is done for making sure of a person with whom the data is communicated, and key information is sent/received for descrambling purpose. Received data has been scrambled by the key and the data is descrambled using the key so as to protect the data.

The first authenticating unit a operates to authenticate a reproduction-dedicated recording medium. The second authenticating unit a operates to authenticate a recordable recording medium with its copy limited by copy limitation information. The third authenticating unit a operates to authenticate a recordable recording medium with no copy limitation by copy limitation information. The CSS authenticating unit a 124 is an authenticating means for the DVD drive to the existing CSS (Content Scrambling System). In this embodiment, the CSS authenticating unit a 124 is described as an independent unit. It may be combined with new authenticating units, that is, the first, the second, and the third authenticating units a as a first authenticating block 129.

The data reproducing unit 2 is assumed to be an MPEG board for decoding the MPEG data. The first authenticating unit b is positioned in correspondence to the first authenticating unit a. The authentication is done by the first authenticating bus 19. If the data is not proper, the descrambling information is not passed as well as the data is disallowed to be outputted from the first data bus 18. Likewise, the second and the third authenticating units b have the same correspondence with the second and the third authenticating units a. If the data is not proper, no authentication is done and the data output is stopped. Herein, for simplifying the description, the authenticating buses and the data buses are respective to the three authenticating units. In actual, the combination of one authenticating bus and one data bus may be switched to each authenticating unit. The CSS authenticating unit b 127 operates to authenticate the MPEG board corresponding to the existing CSS. In this embodiment, the CSS authenticating unit b 127 is described as an independent unit. It may be combined with the new authenticating units, that is, the first, the second and the third authenticating units b as an authenticating block b 130.

The data transmitted from the first reproducing apparatus 1 to the second reproducing apparatus 7 through the first data bus is scrambled for the purpose of preventing copy of the data in transmission. The data on the reproduction-dedicated recording medium is scrambled in a different manner from the data on the recording medium with copy limitation given by copy limitation information. The data on the recordable recording medium with no copy limitation given by the copy limitation information is not scrambled because the copy of the data is not required to be prevented. Under these conditions, the first reproducing apparatus operates to transmit the type of the recording medium and the scrambled data through the effect of the authenticating unit. Herein, the data on the disk with no copy limitation is not required to be scrambled for preventing the copy of the data. However, if no authentication is done only for the data, it is difficult to discriminatingly detect the disk with no copy limitation and the disk illegally copied though the copy of the disk is originally limited. Hence, the authentication is done to the disk with no copy limitation.

If the authentication is done, the scrambled data is transmitted to the second data reproducing apparatus 7. The data bus through which the data is transmitted is selected according to the type of the recording medium and the scrambling structure of the data transmitted by the authenticating unit. The first descrambling unit 11 or the second descrambling unit 12 according to the medium type and the scrambling structure are operated to descramble the data. Then, the descrambled data is sent to the MPEG reproducing unit 15 through the second switch 13. The WM (Water Mark) detecting unit 14 is used for detecting additional information buried in the data decoded by the MPEG reproducing unit 15. In this embodiment, the water mark is detected as the additional information. If the copy control information is detected, the data output is controlled according to the copy control information. In this embodiment, the MPEG reproducing unit 15 is controlled so as to control the output of the data. The control method is not limited to it. For example, the output data may be controlled to be stopped or discarded on the bus.

Herein, the first reproducing unit 2, the first switch 3, the first authenticating unit a 4, the second authenticating unit a 5, and the third authenticating unit a 6 are incorporated on the same LSI for the purpose of making it difficult to pick up the data on the transmitting way. The first authenticating unit b 8, the second authenticating unit b 9, the third authenticating unit b 10, the first scrambling unit 11, the second descrambling unit 12, the second switch 13, the WM detecting unit 14, and the MPEG reproducing unit 15 are incorporated on the same LSI for the purpose of making it difficult to pick up the data on the transmitting way.

Figure 2:
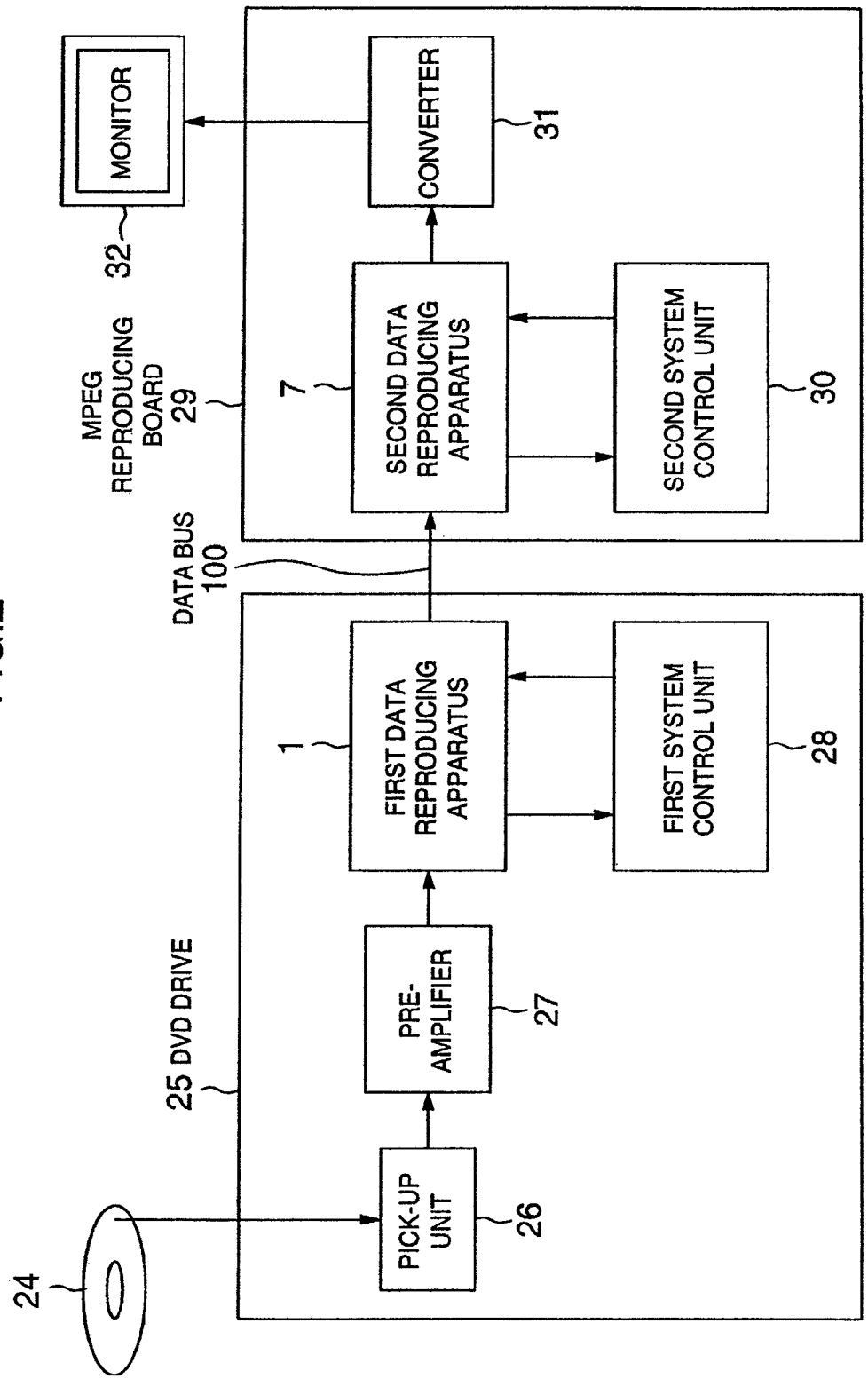
FIG. 2 is a block diagram showing an embodiment in which the apparatus for reproducing data according to the invention is applied to a DVD drive.

FIG. 2 shows the arrangement in which the data reproducing apparatus according to the present invention is applied into the DVD drive. The present embodiment concerns with a recordable and reproducible recording medium such as a DVD. It goes without saying that the recording medium is not limited to an optical disk but may be applied to any kind of recordable and reproducible recording medium.

In FIG. 2, a numeral 24 denotes a DVD disk. A numeral 25 denotes a DVD drive. A numeral 26 denotes a pick-up unit. A numeral 27 denotes a preamplifier. A numeral 28 denotes a first system control unit. A numeral 29 denotes an MPEG reproducing board. A numeral 30 denotes a second system control unit. A numeral 31 denotes a converter. A numeral 32 denotes a monitor.

A signal read from the DVD disk 24 by the pick-up unit 26 is supplied into the first data reproducing apparatus 1. The first data reproducing apparatus 1 determines the operating state under the control of the first system control unit 28. The main operation of the DVD drive 25 corresponds to the process up to this point. The signal reproduced by the first data reproducing apparatus 1 is transmitted to the second data reproducing apparatus 7. The second data reproducing apparatus 7 is operated to determine the operating state under the control of the second system control unit 30. The data reproduced by the second data reproducing apparatus 7 is converted by the converter 31 and then is outputted into the monitor 32 on which the data is displayed. The process up to this point corresponds to the main operation of the MPEG reproducing board 29.

Figure 3:
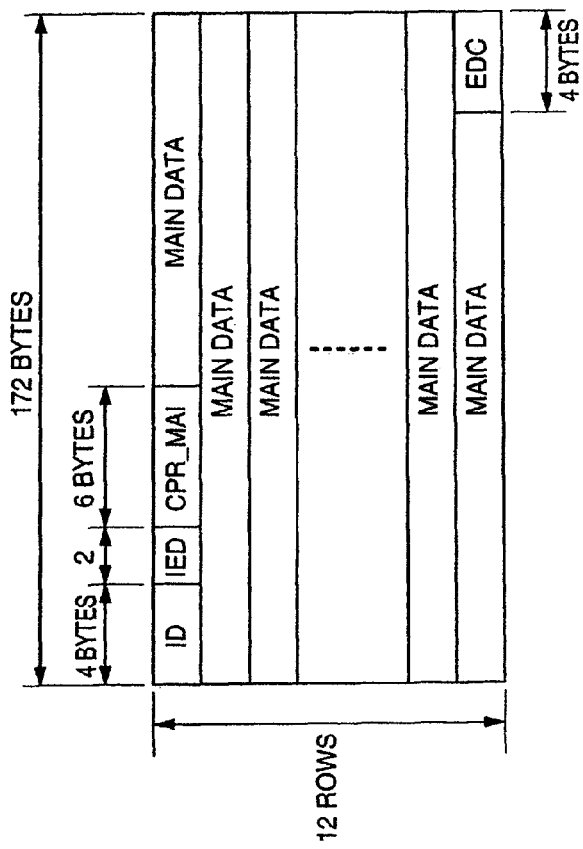
FIG. 3 is a view showing a composition of DVD sector data as an example of data containing codes on which a type of a recording medium and a scrambling structure of data are recorded.

FIG. 3 shows a composition of sector data of the DVD as an example of data containing codes having a type of the recording medium and a scrambling structure of the data recorded therein. In the DVD, the identification data simply called ID and the copyright management information called CPR_MAI are written before the main data of 2048 bytes.

The copyright management information (CPR_MAI) covers both the copyright management information and the region management information. The read-in area describes whether or not the data contains a specific data structure (corresponding to the scramble structure) of the copyright protection system and whether or not the data may be reproduced on a specified region. The data area describes whether or not the sector contains a material with a copyright, whether or not the data has a specific data structure of the copyright protection system, and whether or not the data is copy-limited (copy permission, one-generation copy permission, and copy prohibition).

Figure 4:
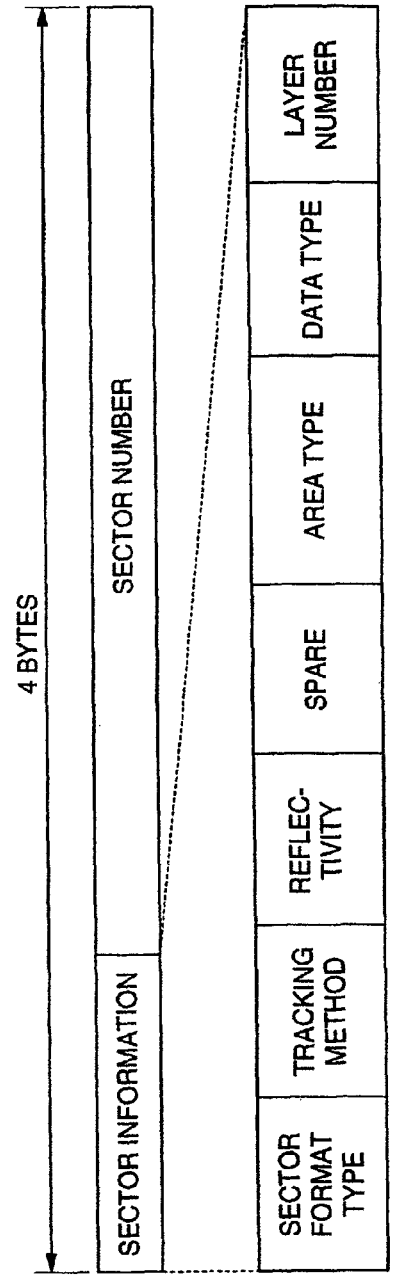
FIG. 4 is a view showing a composition of identification (ID) data of a DVD.

FIG. 4 shows the composition of the ID data of the DVD. The ID contains a reproduction-dedicated data called a data type or an auxiliary code for write-once data and rewritable data in the first four bytes of the sector information.

A sector format type described a CLV format type specified by the reproduction-dedicated disk and the write-once disk or a zone format type specified for a rewritable disk. An area type records a data area, a read-in area, a read-out area, or a middle area of a reproduction-dedicated disk. The data type is spared for the reproduction-dedicated data or the write-once data (link data) and the rewritable data.

Figure 5:
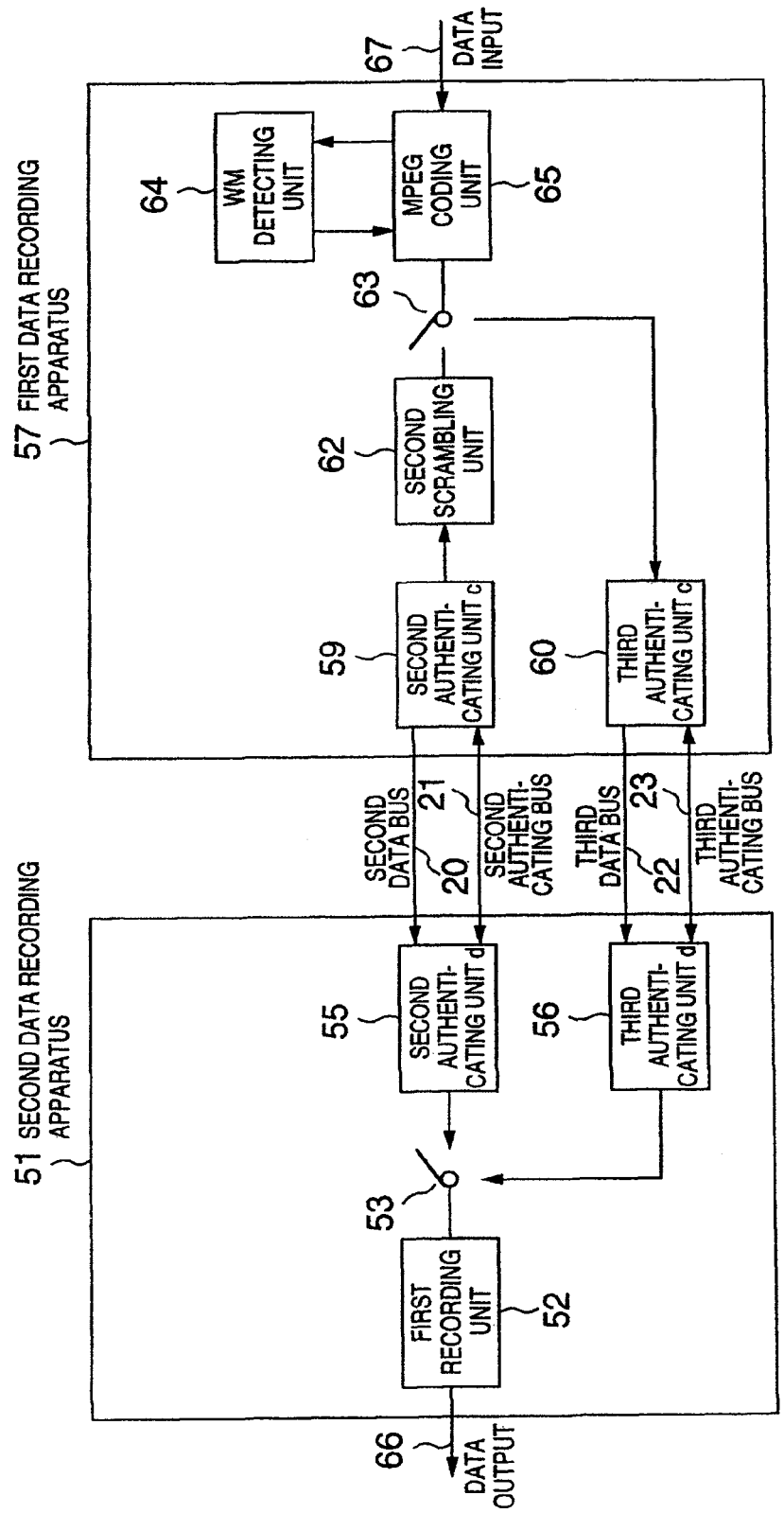
FIG. 5 is a block diagram showing an apparatus for recording data containing copy control information according to an embodiment of the present invention.

FIG. 5 shows a recording apparatus for recording data containing the copy control information according to an embodiment of the present invention. The present embodiment concerns with a recordable and reproducible recording medium such as a DVD. It goes without saying that the recording medium is not limited to an optical disk but may be applied to any kind of recordable and reproducible medium.

In FIG. 5, a numeral 51 denotes a second data recording apparatus. A numeral 52 denotes a first recording unit. A numeral 53 denotes a fourth-switch. A numeral 55 denotes a second authenticating unit d. A numeral 56 denotes a third authenticating unit d. A numeral 57 denotes a first data recording apparatus. A numeral 59 denotes a second authenticating unit c. A numeral 60 denotes a third authenticating unit c. A numeral 62 denotes a second scrambling unit. A numeral 63 denotes a third switch. A numeral 64 denotes a WM detecting unit. A numeral 65 denotes an MPEG coding unit. A numeral 66 denotes a data output. A numeral 67 denotes a data input. The numeral 20 denotes a second data bus. The numeral 21 denotes a second authenticating bus. The numeral 22 denotes a third data bus. The numeral 23 denotes a third authenticating bus.

The data input 67 such, as video data read from the disk by the first data reproducing apparatus such as a DVD drive and outputted on the monitor is coded according to the format for converting and recording the digital data by the first recording unit (52). At this time, the type of the data such as a code for, indicating the type of the recording medium (for example, a code for indicating if the medium is reproduction-dedicated or recordable) is written according to the format. As another type of data, for example, the code for indicating if the data structure is scrambled by copy control and the code for indicating copy limitation (for example, a code for indicating copy permission, one-generation copy permission or copy prohibition) is written as well. Next, if the data needs copy control, the scrambling based on the recording medium and the state of copy control is carried out. Herein, the third switch is switched on the copy control information so as to select the authenticating unit.

The water mark detecting unit 64 operates to detect the copy control information that is additional information added to the data inputted into the MPEG coding unit 65. The control is executed according to the copy control information. For example, if the detected information indicates copy prohibition, the output of the recording data is stopped. If it indicates no copy limitation, the coding process is executed without scrambling. In this embodiment, the MPEG coding unit 65 is served to control the output of the data. The control method is not limited to it. The method may be the stop of the output data, the breakage of the data on the bus, and so forth.

The second authenticating unit c operates to authenticate the recordable recording medium whose copy is limited by the copy limitation information. The third authenticating unit c operates to authenticate the recordable recording medium whose copy is not limited by the copy limitation information.

Further, though not illustrated in this, embodiment, like the reproducing apparatus, the authenticating unit corresponding to the existing CSS may be included in this embodiment. This CSS authenticating unit may be combined with those authenticating units as an authenticating block.

The first data recording apparatus is an MPEG board for encoding the MPEG data.

The second authenticating unit d has the corresponding relation with the second authenticating unit c. The authentication is done through the use of the second authenticating bus 71. If it does not have the corresponding relation therewith, no descrambling method is passed and the output of the data from the second data bus 70 is stopped. The third authenticating unit d has the corresponding relation with the third authenticating unit c. If it does not have the corresponding relation therewith, no authentication is done and the output of the data is stopped. Herein, for simplifying the description, the authenticating buses for two combinations of authenticating units and the data buses for transmitting the data from the authenticating units are described as independent buses. One combination of a data bus and an authenticating bus may be switched for two authenticating units.

The data transmitted from the first data recording apparatus 51 to the second data recording apparatus 57 is scrambled for the purpose of preventing the copy of the data in transmission. The data whose copy is not limited by the copy limitation information is not scrambled because it does not need copy protection.

Hence, the first data recording apparatus 1 operates to transmit the scrambled data through the use of the authenticating unit. The third switch 63 is served to select a proper one of the buses that pass the scrambling unit 2 according to the data and do not pass the scrambling unit so that the proper scrambling to the data may be executed.

When the authentication is done, the data is transmitted as being scrambled. The authenticating unit is executed to select the data bus that is allowed to transmit the data according to the type of the recording medium and the scrambling structure of the data. Then, the data is sent to the first recording unit 52 through the fourth switch 53.

Herein, the second authenticating unit c 59, the third authenticating unit c 60, the second scrambling unit 62, the third switch 63, the WM detecting unit 64, and the MPEG coding unit 65 are incorporated on the same LSI for the purpose of making it difficult to pick up the data on the transmitting way. The first recording unit 52, the fourth switch 53, the second authenticating unit d 55, and the third authenticating unit d 56 are incorporated on the same LSI for the purpose of making it difficult to pick up the data on the transmitting way.

Figure 6:
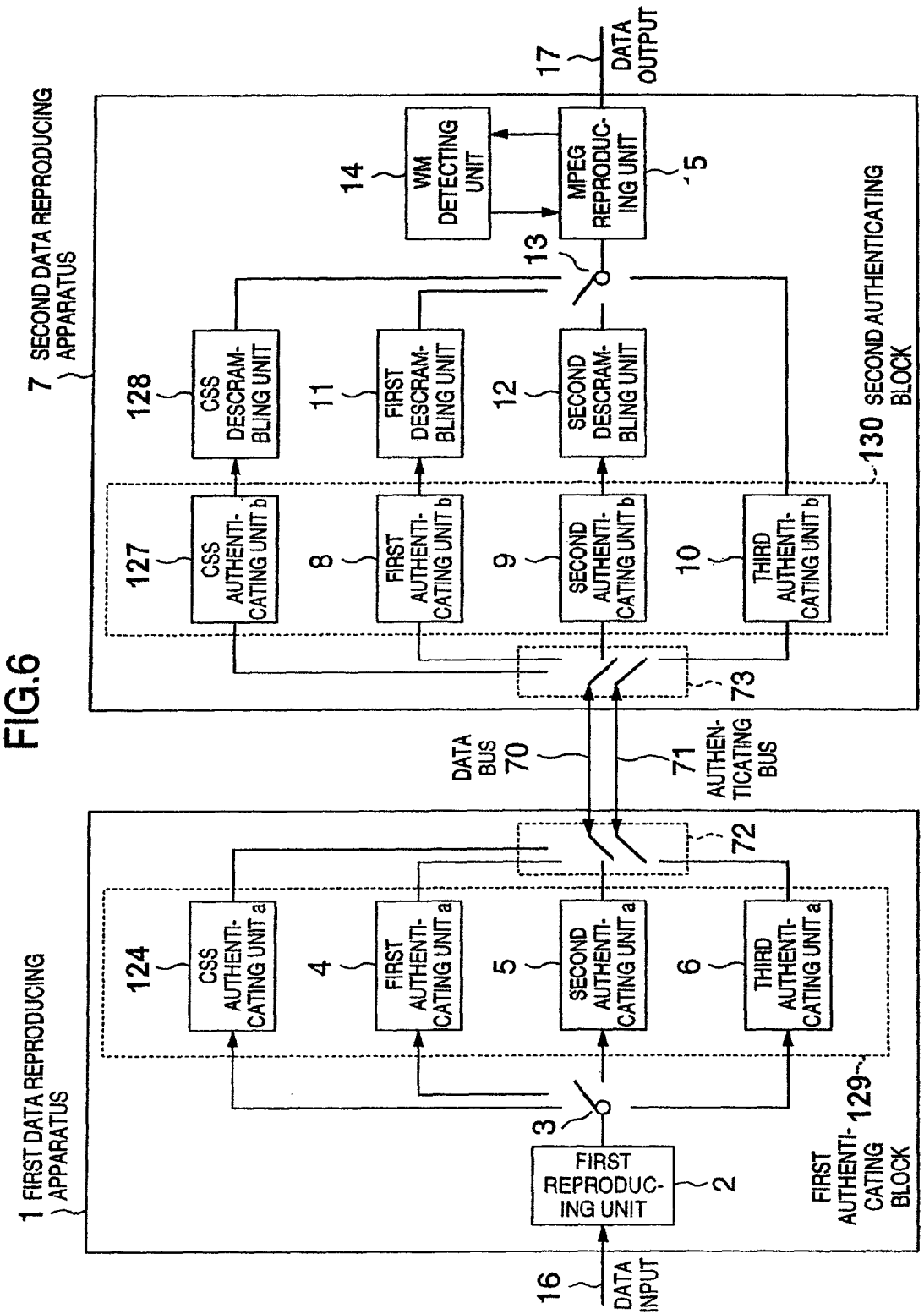
FIG. 6 is a block diagram showing another apparatus for reproducing data containing copy control information according to an embodiment of the present invention.

FIG. 6 shows an apparatus for reproducing data containing the copy control information according to another embodiment of the present invention. This embodiment selectively uses one combination of a data bus and an authenticating bus for all the authenticating units in the embodiment shown in FIG. 1, though the embodiment in FIG. 1 contains the corresponding combination of a data bus and an authenticating bus to each of the authenticating units. In the following embodiment, the same numerals as those in FIG. 1 indicate the same components.

In FIG. 6, a numeral 70 denotes a unified data bus. A numeral 71 denotes a unified authenticating bus. A numeral 72 denotes a switch for switching the authenticating units included in the first authenticating block. A numeral 73 denotes a switch for switching the authenticating units included in the second authenticating block. This arrangement results in making it possible to serve one data bus and one authenticating bus for all the authenticating units, thereby reducing the connecting lines between the apparatuses in number.

Figure 7:
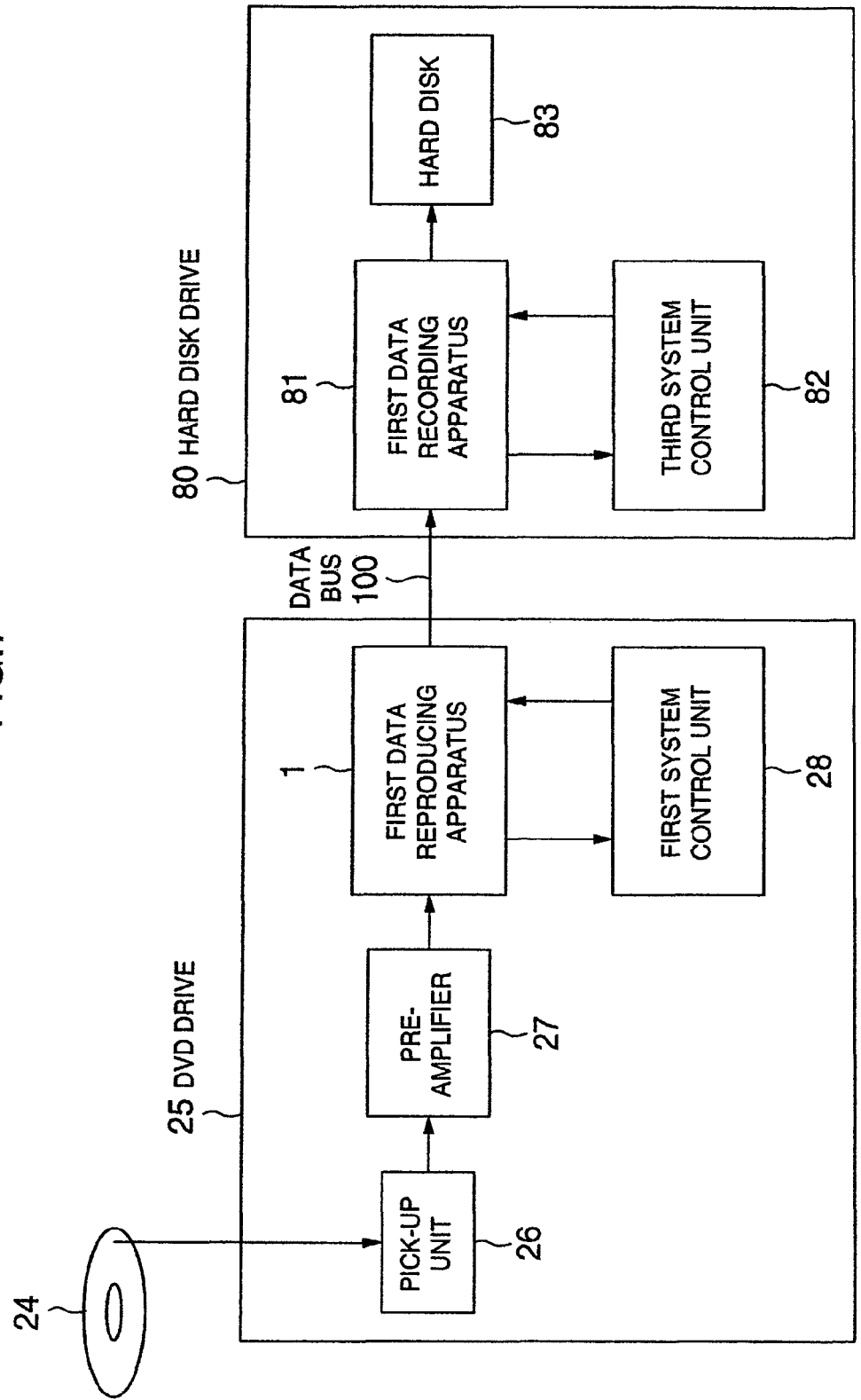
FIG. 7 is a block diagram showing an arrangement in which an apparatus for reproducing data according to the invention is applied to a DVD drive so that the output signal is connected to a recordable device such as a harddisk.

FIG. 7 shows the arrangement in which the data reproducing apparatus according to the present invention is applied to the DVD drive and the output signal of the DVD drive is connected to a recordable device such as a harddisk. The present embodiment concerns with the recordable and reproducible recording medium such as a harddisk. It goes without saying that the recording medium is not limited to the recordable and reproducible recording medium such as a harddisk but may be applied to any kind of device that sends and receives data though the data bus.

In FIG. 7, a numeral 80 denotes a harddisk device. A numeral 81 denotes a first recording device. A numeral 82 denotes a system control unit. A numeral 83 denotes a harddisk.

The signal read out of the DVD disk 24 by the pick-up unit 26 is supplied into the first data reproducing device 81 through the preamplifier 27. The first data reproducing device 81 determines the operating state under the control of the first system control unit 28. The process up to this point corresponds to the main operation of the DVD drive 25. The signal reproduced by the first data reproducing device 1 is transmitted into the first data recording device 81. The first data recording device 1 determines the state of the recording operation under the control of the third system control unit 82. The data reproduced by the first data recording device 81 is recorded onto the harddisk 83. The process up to this point corresponds to the main operation of the harddisk device 80.

Herein, the device that records data is required to control the recording along the copy control information. In order to make sure that the device has a function of properly controlling the recording, the first data reproducing device 1 has to authenticate the, second data recording device 81. The data passed from the first data reproducing device 1 to the first data recording device 81 is scrambled in transmission if the data has to be protected. Hence, the first data reproducing device 1 and the first data recording device 81 provides means for scrambling data, means for descrambling data, and means for passing a scrambling key. If the authentication is failed, the first data reproducing device 1 stops the data output to the second data recording device 81. If the data output is done, the data is scrambled and no key is passed, so that the data cannot be correctly reproduced. It means that if the scrambled data is directly recorded in the recording device, the data cannot be correctly reproduced.

Further, herein, the description concerns with the transfer of the data with the recording device. About the reproducing device and the output device, likewise, the DVD drive operates to authenticate if the reproducing or the output device enables to correctly control the copying operation for the purpose of protecting the data.

The provision of these means in transferring the data makes it possible to correctly control copying of copyrighted data and prevent illegal copying or reproduction.

Figure 8:
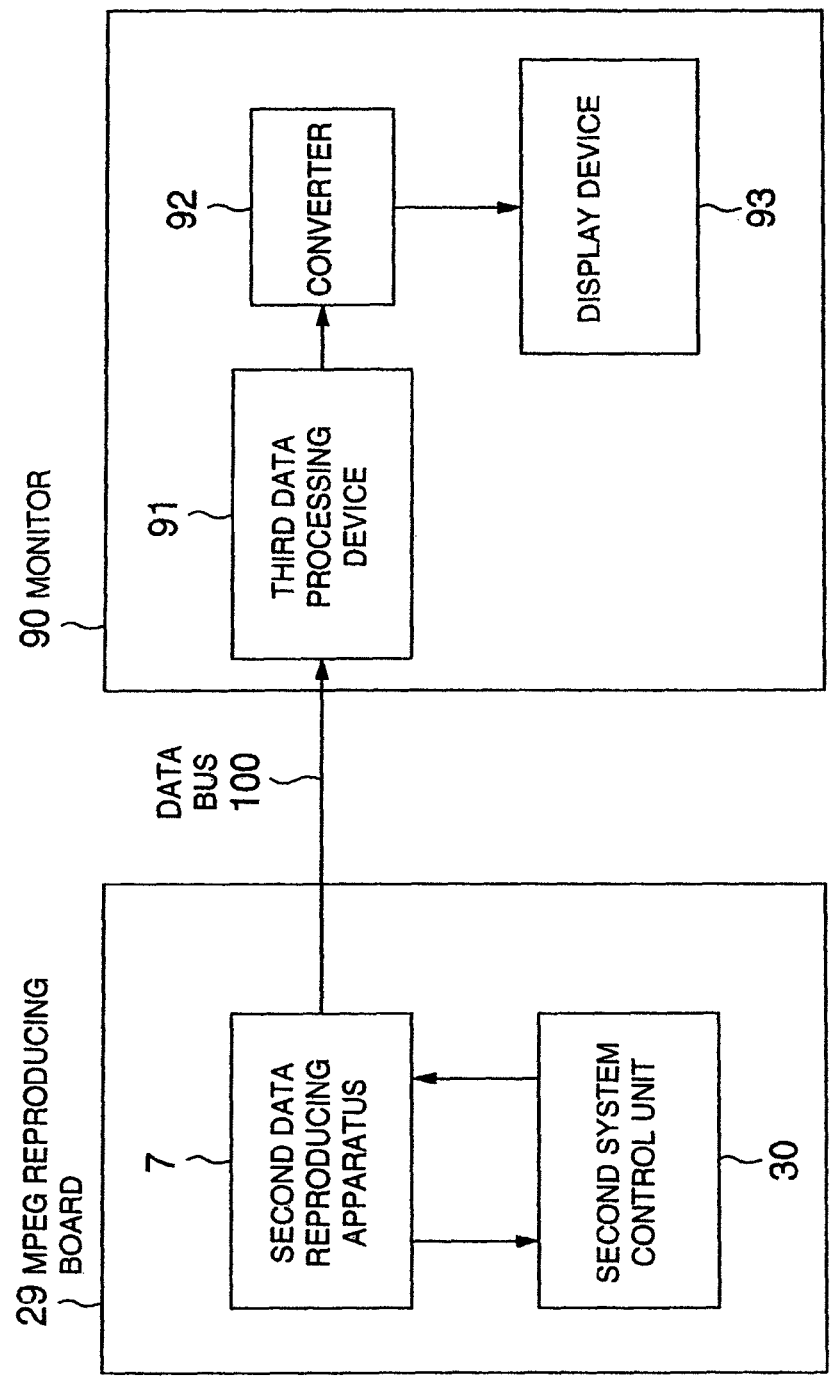
FIG. 8 is a block diagram showing an arrangement in which an apparatus for outputting data is applied to a monitor.

FIG. 8 shows the arrangement in which the, data output apparatus according to the present invention is applied into a monitor. The present embodiment concerns with the monitoring output, for example. It goes without saying that it is not limited to the monitor but may be applied to any kind of device that serves to receive and send the data through the data bus.

In FIG. 8, a numeral 90 denotes a monitor. A numeral 91 denotes a third data processing device. A numeral 92 denotes a converter. A numeral 93 denotes a display device.

The MPEG board 29 outputs the data onto the monitor 90. The data inputted into the monitor 90 is converted by the converter 31 and then outputted onto the monitor 32 on which the image is displayed. The process up to this point corresponds to the main operation of the monitor.

If the data is inputted into, the monitor 90 through the data bus 100, the data may be scrambled for protecting the data from being illegally recorded. In this case, the third data processing device 91 operates to descramble the data and then output the resulting data into the converter 92. It means that the third data processing device 91 needs the corresponding authenticating unit to the MPEG board 29. The authenticating unit may operate to authenticate that the output from the MPEG board 29 is outputted only to the display device such as the monitor 90, not to the recording device. If no recording device is connected, the data is not illegally copied. Hence, when the data is outputted onto the monitor 90, it is not necessary to scramble the data.

The provision of these means in passing the data results in making it possible to correctly control the copying operation of the copyrighted data, thereby preventing illegal copying and reproduction.

Figure 9:
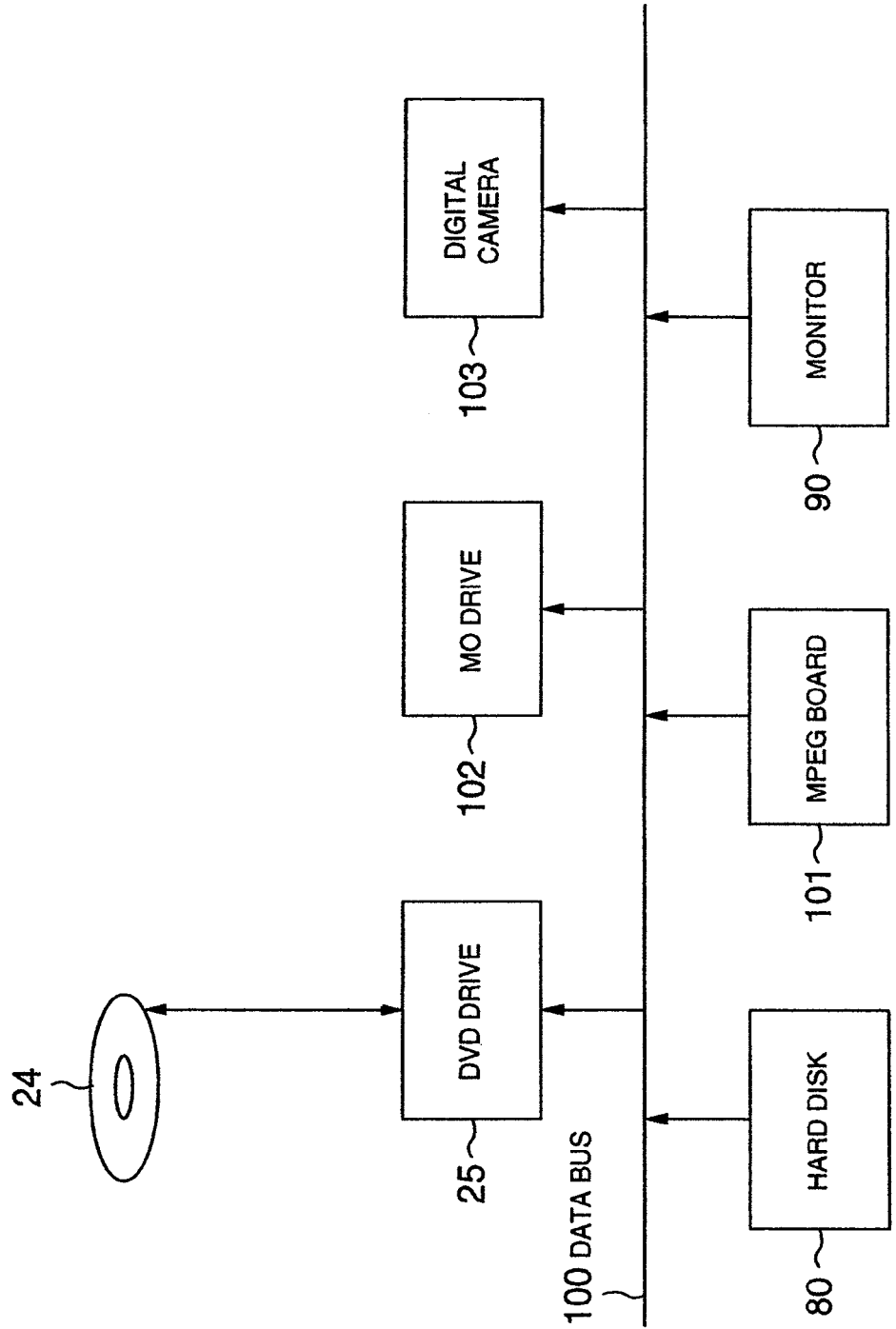
FIG. 9 is a block diagram showing a system provided with each device according to the present invention, such as a personal computer.

FIG. 9 shows a reproducing or recording and reproducing apparatus configured as a system, for example, a personal computer, having a plurality of data processing means (hereinafter referred to as a "device"), such as the above-explained data reproducing apparatus, data recording and reproducing apparatus and so on. The personal computer may easily change the layout of those devices. Hence, the combination of those devices is not limited to the combination described in this embodiment but may concern the combination of all the devices that pass the data.

In FIG. 9, a numeral 101 denotes an MPEG board. A numeral 102. denotes a MO drive. A numeral 103 denotes a digital camera.

The personal computer-is arranged to pass the data among the devices through the data bus 100. The authentication is done to the devices connected with the data bus.

If no authentication is established, it is determined that the device does not provide a function of correctly controlling the copying operation. The data output is stopped. At this time, if the data is permitted to be merely reproduced. The data output is made possible only if no recording device is connected to the data bus and the connected devices have only the reproducing function.

Further, if no authentication is established, the data may be passed on the data bus only if the data to be passed has no copy limitation.

These authentications are made possible by the circuit provided in each device. Instead, in such a case as the personal computer, the software for controlling each device may provide the authenticating function. Further, the authentication may be done on the operating system for systematically controlling each device. Then, according to the authenticated result, each device may be controlled. As described above, the authentication is executed between the devices connected with the data bus according to the type of the data. According to the result, the transfer of the data may be controlled. This makes it possible to correctly control the copying operation.

Figure 10:
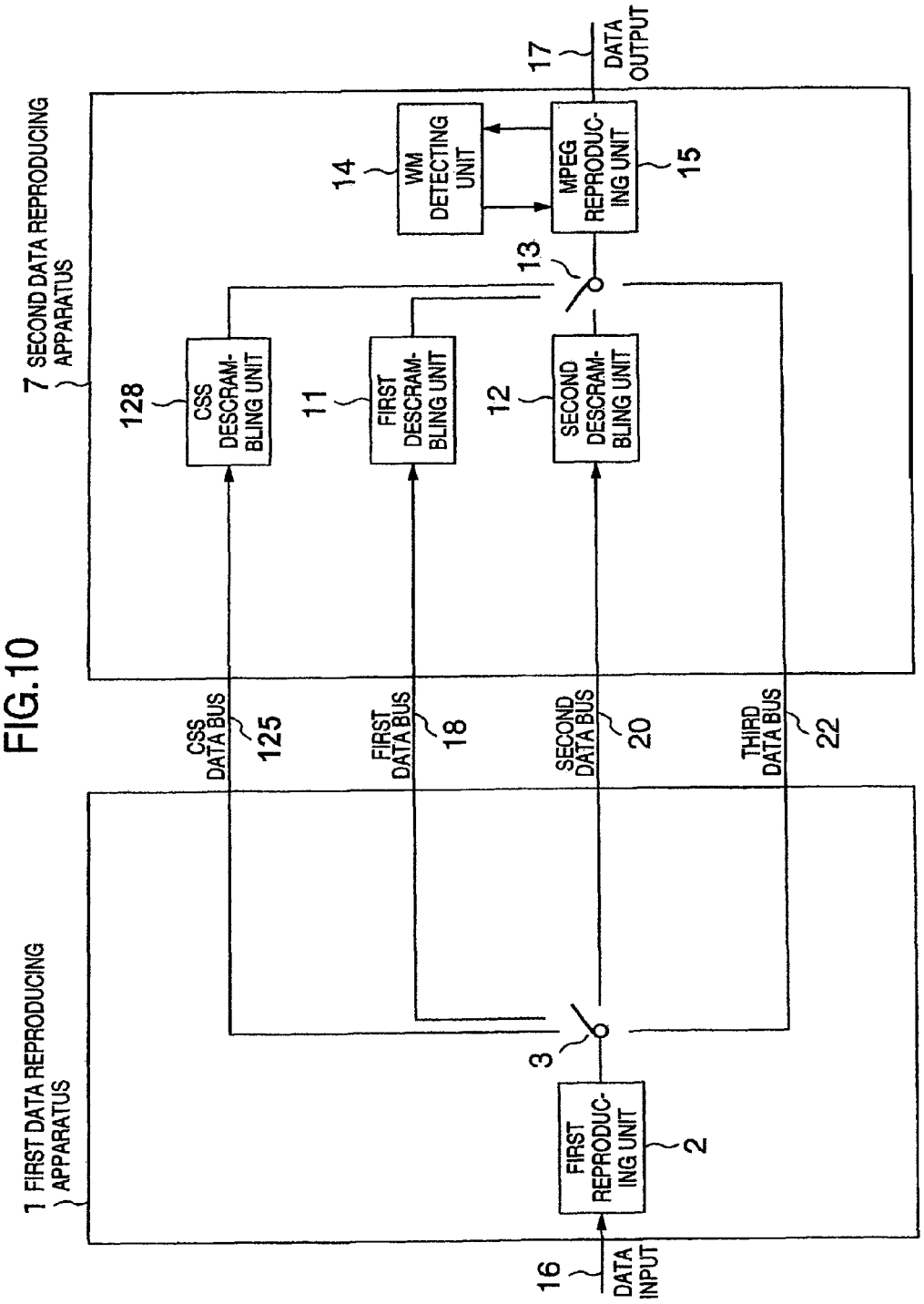
FIG. 10 is a block diagram showing a data reproducing apparatus for reproducing data including copy controlling information according to another embodiment of the present invention.

FIG. 10 is a block diagram showing a data reproducing apparatus for reproducing data including copy controlling information according to another embodiment of the present invention. The apparatus of FIG. 10 is an example in which the apparatus shown in FIG. 1 is formed within one apparatus as in, for example, consumer DVD players. In such apparatuses, since it is difficult to interchange the DVD drive with the MPEG board and vice versa, no authentication is required. Also, when the DVD signal processing and MPEG decoding are carried out as internal processing in the same LSI, no authentication is required since no connection to outside is possible to do and it is also impossible to tap the signals out of the data buses. In those cases, it is not necessary to provide a plurality of authenticating units and reproduction may be carried out by switching among a plurality of the descrambling units.

According to the present invention, in the case of reproducing the data scrambled in respective manner to the types of the recording medium and the copy control information, the corresponding authenticating unit to each scrambling manner is properly switched. This makes it possible to do the descrambling operation according to the scrambling manner. Further, if no authentication is established, the data output is stopped. It is thus possible to prevent the illegally copied data from being recorded and reproduced.

In addition, the incorporation of these functions on the same LSI makes it difficult to pick up the data on the transmitting way.

What is claimed is:

1. An authenticating method for a recording apparatus capable of recording, onto a plurality of recording mediums of different types, scrambled data as is that is outputted from a data output apparatus, wherein said recording apparatus is configured to be capable of handling a plurality of scrambling methods of different types corresponding to said plurality of recording mediums of different types, said plurality of scrambling methods of different types each include an authenticating method for conducting authentication between said recording apparatus and said data output apparatus, said authenticating method comprising:

selecting, from said plurality of scrambling methods of different types, a predetermined scrambling method; and conducting authentication with said data output apparatus by an authenticating method which corresponds to said selected scrambling method, and sending/receiving information about the scrambling to/from said data output apparatus.

2. The authenticating method according to claim 1, wherein said selecting, from said plurality of scrambling methods of different types, a predetermined scrambling method, is conducted based on said types of the recording medium.

3. The authenticating method according to claim 1, wherein said plurality of scrambling methods of different types include scrambling methods for conducting scrambling corresponding to copy control states of the data to be recorded onto said recording mediums.

4. An authenticating method for a reproducing apparatus capable of reproducing data that is recorded in a scrambled state in a plurality of recording mediums of different types and outputting the reproduced data to a decoding apparatus, wherein said reproducing apparatus is configured to handle a plurality of scrambling methods of different types corresponding to said plurality of recording mediums of different types, said plurality of scrambling methods of different types each include an authenticating method for conducting authentication between said reproducing apparatus and said decoding apparatus, said authenticating method comprising:

selecting, from said plurality of scrambling methods of different types, a predetermined scrambling method; and conducting authentication with said decoding apparatus by an authenticating method which corresponds to said selected scrambling method, and sending/receiving information about the scrambling to/from said decoding apparatus.

5. The authenticating method according to claim 4, wherein said step of selecting, from said plurality of scrambling methods of different types, a predetermined scrambling method, is conducted based on said types of the recording medium.

6. The authenticating method according to claim 4, wherein said plurality of scrambling methods of different types include scrambling methods for carrying out scrambling corresponding to copy control states of the data to be recorded onto said recording mediums.

7. A recording apparatus capable of recording, onto a plurality of recording mediums of different types, scrambled data as is that is outputted from a data output apparatus, comprising:

authenticating units that conduct authentication with said data output apparatus; and a recording unit that records the scrambled data as is onto the recording mediums, wherein said recording apparatus is configured to be capable of handling a plurality of scrambling methods of different types corresponding to said plurality of recording mediums of different types, said plurality of scrambling methods of different types each include an authenticating method for conducting authentication between said recording apparatus and said data output apparatus, said authenticating units being configured to:

conduct authentication with said data output apparatus by an authenticating method which corresponds to a predetermined scrambling method which is selected from among said plurality of scrambling methods of different types, and send/receive information about the scrambling to/from said data output apparatus.

8. The recording apparatus according to claim 7, wherein said predetermined scrambling method is selected from said plurality of scrambling methods of different types based on said types of the recording medium.

9. The recording apparatus according to claim 7, wherein said plurality of scrambling methods of different types include scrambling methods for carrying out scrambling corresponding to copy control states of the data recorded in said recording mediums.

10. A reproducing apparatus capable of reproducing data that is recorded in a scrambled state in a plurality of recording mediums of different types and outputting the reproduced data to a decoding apparatus, comprising:

authenticating units which conduct authentication with said decoding apparatus; and a data reproducing unit which reproduces data recorded in a scrambled state in said recording mediums, wherein said reproducing apparatus is configured to handle a plurality of scrambling methods of different types corresponding to said plurality of recording mediums of different types, said plurality of scrambling methods of different types each include an authenticating method for conducting authentication between said reproducing apparatus and said decoding apparatus, said authenticating units are configured to conduct authentication with said decoding apparatus by an authenticating method which corresponds to the predetermined scrambling method selected from said plurality of scrambling methods of different types, and send/receive information about the decoding to/from said decoding apparatus.

11. The reproducing apparatus according to claim 10, wherein the predetermined scrambling method is selected from said plurality of scrambling methods of different types based on said types of the recording medium.

12. The reproducing apparatus according to claim 10, wherein said plurality of scrambling methods of different types include scrambling methods for conducting scrambling corresponding to copy control states of the data recorded on said recording mediums.

\* \* \* \* \*